(12) United States Patent
Campbell et al.

(10) Patent No.: US 10,719,385 B2
(45) Date of Patent: Jul. 21, 2020

(54) METHOD AND APPARATUS FOR IMPROVED ERROR HANDLING

(71) Applicant: Hyland Software, Inc., Westlake, OH (US)

(72) Inventors: Brian Campbell, Cumming, GA (US); Yana Poliashenko, Alpharetta, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 1148 days.

(21) Appl. No.: 15/086,428

(22) Filed: Mar. 31, 2016

(65) Prior Publication Data
US 2017/0286207 A1 Oct. 5, 2017

(51) Int. Cl.
G06F 11/07 (2006.01)
G06Q 10/10 (2012.01)
G06F 16/00 (2019.01)

(52) U.S. Cl.
CPC ...... *G06F 11/0793* (2013.01); *G06F 11/0709* (2013.01); *G06F 11/0751* (2013.01); *G06F 11/0772* (2013.01); *G06F 16/00* (2019.01); *G06Q 10/10* (2013.01); *G06Q 10/103* (2013.01)

(58) Field of Classification Search
CPC ............ G06F 11/0793; G06F 11/0709; G06F 11/0751; G06F 11/0772; G06F 16/00; G06Q 10/10; G06Q 10/103
See application file for complete search history.

(56) References Cited

U.S. PATENT DOCUMENTS

| | | | | |
|---|---|---|---|---|
| 8,682,934 | B2 * | 3/2014 | Hokimoto | G06F 16/489 707/802 |
| 8,725,718 | B2 * | 5/2014 | Inoue | G06F 16/58 707/708 |
| 8,751,252 | B2 * | 6/2014 | Chamberlain | G06F 19/321 705/2 |
| 8,935,217 | B2 * | 1/2015 | Suitts | H04L 67/06 705/50 |
| 9,075,878 | B2 * | 7/2015 | Hayashi | G06F 16/93 |
| 9,602,850 | B2 * | 3/2017 | Qian | H04N 21/2353 |
| 9,904,585 | B1 * | 2/2018 | Islam | G06F 11/079 |
| 10,289,430 | B2 * | 5/2019 | King | G06F 9/44505 |

(Continued)

*Primary Examiner* — Robert W Beausoliel, Jr.
*Assistant Examiner* — Susan F Rayyan
(74) *Attorney, Agent, or Firm* — Medley, Behrens & Lewis, LLC (57) ABSTRACT

A method, apparatus and computer program product provide mechanisms for improved error handling in workflow management systems. An example of the method includes receiving a first content item in an electronic workflow management system, the first content item comprising an electronic document and a set of document metadata, validating the first content item to determine that an error exists within the first content item, the validation performed according to a set of validation rules, in response to determining that an error exists within the first content item, identifying the first content item as an erroneous content item, determining error metadata associated with the first content item, generating a packaged erroneous content item comprising the first content item and the error metadata, and processing the packaged erroneous content item by a workflow engine of the electronic workflow management system.

18 Claims, 6 Drawing Sheets

(56) References Cited

U.S. PATENT DOCUMENTS

| | | | |
|---|---|---|---|
| 2007/0079168 A1* | 4/2007 | Sivakumar | G06F 11/0709 |
| | | | 714/1 |
| 2007/0292012 A1* | 12/2007 | Brandon | G06F 19/321 |
| | | | 382/128 |
| 2008/0195651 A1* | 8/2008 | Rachmiel | G06F 21/604 |
| 2009/0031377 A1* | 1/2009 | Jacobs | H04N 7/17336 |
| | | | 725/105 |
| 2012/0072783 A1* | 3/2012 | Li | G06F 11/0769 |
| | | | 714/57 |
| 2012/0236201 A1* | 9/2012 | Larsen | G06Q 10/10 |
| | | | 348/468 |
| 2013/0298061 A1* | 11/2013 | Bimson | G06Q 10/06 |
| | | | 715/771 |
| 2013/0311420 A1* | 11/2013 | Tehranchi | G06Q 30/018 |
| | | | 707/608 |
| 2014/0115508 A1* | 4/2014 | MacLean | G06F 3/0483 |
| | | | 715/764 |
| 2014/0223573 A1* | 8/2014 | Reedy | G06F 21/6218 |
| | | | 726/26 |
| 2016/0162969 A1* | 6/2016 | Dotterer | G06Q 30/0625 |
| | | | 705/26.62 |
| 2016/0188553 A1* | 6/2016 | Myers | G06F 17/2235 |
| | | | 715/753 |
| 2016/0358490 A1* | 12/2016 | Etzioni | G09B 5/02 |
| 2017/0017646 A1* | 1/2017 | Kumar | G06F 21/64 |
| 2018/0096020 A1* | 4/2018 | Sreenivasa | G06F 16/958 |

* cited by examiner

METHOD AND APPARATUS FOR IMPROVED ERROR HANDLING

TECHNOLOGICAL FIELD

Example embodiments of the present invention relate generally to methods, systems, and computer readable storage media for processing electronic content and, more particularly, to methods, systems, and computer readable media for improving error handling in systems for processing electronic content.

BACKGROUND

As computers have become more and more common, it has become more and more necessary for organizations to implement intra-system interfaces that allow disparate systems to communicate with one another. Many organizations also employ advanced workflow management systems that are capable of receiving content from these disparate systems and processing that content to generate tasks, create notifications, schedule processes, and the like. To this end, advanced workflow management systems are often configured to receive both documents and metadata about those documents to create and manage tasks, transport documents between systems, store content for later retrieval, and the like. These workflow systems are often able to communicate with a variety of external systems provided by different vendors, systems across release versions, and other applications where the workflow system is decoupled from the external systems providing the content items for processing.

While such workflow management systems are often highly configurable and able to support content items provided in a variety of different formats, this flexibility comes at a price. In order to support a large number of different content types offered by external systems, these systems are often unable to properly process content that has errors or formatting problems. While data validation processes exist for verifying that received content items are properly formatted and have valid data values, these processes are primitive, rejecting and discarding content items that are unable to be validated by workflow management systems. A discarded content item generates an error that is sent to the system that provided the content, requiring the transmitting system to resend the content item. However, in cases where content items are part of large batch processing jobs (e.g., a scan of dozens or hundreds of documents), triggering of an error condition may cause rejection of the entire batch processing job, requiring the transmitting system to resend a large amount of data or even reprocess the batch process, resulting in a large amount of inefficiency, consuming system resources, and delaying processing of jobs even in scenarios where the validation errors are relatively minor. Through applied effort, ingenuity, and innovation, the inventors have solved many of these identified problems by developing a technical solution that is embodied by the present invention, which is described in detail below.

BRIEF SUMMARY

Methods, apparatuses and computer program products are therefore provided according to example embodiments of the present invention to intelligently handle errors in content items received in a workflow management system. Embodiments provide improved workflow management systems that are capable of performing validation operations on received content to identify erroneous content. Identified erroneous content may be processed to attempt to automatically rectify errors. Content items having errors that cannot be rectified may be processed to determine error metadata relating to the erroneous content item. The erroneous content item and the error metadata may be processed into a packaged content item suitable for processing by the workflow management system. Embodiments also provide for processing of the packaged content item to generate workflows for correcting the content item and addressing the error.

An example of an embodiment includes a method for providing improved error handling. The method includes receiving a first content item in an electronic content management system, the first content item comprising an electronic digital media item and a set of content metadata, validating the first content item, the validation performed according to a set of validation rules, wherein the validation determine that an error exists within the first content item, in response to determining that an error exists within the first content item, identifying the first content item as an erroneous content item, generating error metadata associated with the first content item, generating a packaged erroneous content item comprising the first content item and the error metadata, and processing the packaged erroneous content item by a workflow engine of the electronic content management system.

In some embodiments, the method may include receiving a second content item, validating the second content item according to the set of validation rules, in response to determining that the second content item passes validation, processing the second content item by the workflow engine of the electronic content management system. Processing the packaged erroneous content item may include generating an interface for receiving at least one edit to the set of document metadata, receiving, via the interface, the at least one edit to the set of document metadata, applying the edit to the first content item, validating the first content item again subsequent to applying the edit to the first content item, and processing the first content item by the workflow engine in response to successfully validating the first content item. Processing the packaged erroneous content item may include generating a task for correcting the first content item, and transmitting a notification of the task to at least one user. The method may include receiving at least one correction to the first content item, validating the first content item subsequent to receiving the at least one correction, and deleting the task for correcting the first content item in response to successfully validating the first content item.

The error metadata may include an identifier indicating at least one of a metadata field that failed validation, a batch processing identifier, a time at which the first content item was received. Processing the packaged erroneous content item may include determining that the error metadata of the packaged erroneous content item shares at least one common characteristic with at least one another packaged erroneous content item, grouping the packaged erroneous content item and the at least one another packaged erroneous content item in an error context, and generating a single task for correcting the packaged erroneous content item and the at least one another erroneous packaged content item. The method may include determining an error type of the error, determining at least one remedial measure based on the error type, applying the remedial measure, and identifying the first content item as an erroneous content item in response to a failure of the remedial measure. The remedial measure may include performing an optical character recognition operation on the electronic document, parsing the electronic document subsequent to the optical character recognition operation to identify one or more text terms, and determining whether the one or more identified text terms include at least one valid value for at least one field of the set of document metadata.

Another example of an embodiment provides an apparatus for providing improved error handling. The apparatus includes a processor and a memory. The memory stores instructions that configure the processor to at least receive a first content item in an electronic content management system, the first content item comprising an electronic digital media item and a set of content metadata, validate the first content item, the validation performed according to a set of validation rules, wherein the validation determine that an error exists within the first content item, in response to determining that an error exists within the first content item, identify the first content item as an erroneous content item, generate error metadata associated with the first content item, generate a packaged erroneous content item comprising the first content item and the error metadata, and process the packaged erroneous content item by a workflow engine of the electronic content management system.

The apparatus may be further configured to receive a second content item, validate the second content item according to the set of validation rules, in response to determining that the second content item passes validation, and process the second content item by the workflow engine of the electronic content management system. The apparatus may be further configured to process the packaged erroneous content item by at least generating an interface for receiving at least one edit to the set of document metadata, receiving, via the interface, the at least one edit to the set of document metadata, applying the edit to the first content item, validating the first content item again subsequent to applying the edit to the first content item, and processing the first content item by the workflow engine in response to successfully validating the first content item. The apparatus may be further configured to process the packaged erroneous content item by at least generating a task for correcting the first content item, and transmitting a notification of the task to at least one user. The apparatus may be further configured to receive at least one correction to the first content item, validate the first content item subsequent to receiving the at least one correction, and delete the task for correcting the first content item in response to successfully validating the first content item. The error metadata may include at least one of a metadata field that failed validation, a batch processing identifier, a time at which the first content item was received.

The apparatus may be further configured to process the packaged erroneous content item by at least determining that the error metadata of the packaged erroneous content item shares at least one common characteristic with at least one another packaged erroneous content item, grouping the packaged erroneous content item and the at least one another packaged erroneous content item in an error context, and generating a single task for correcting the packaged erroneous content item and the at least one another erroneous packaged content item. The apparatus may be further configured to determine an error type of the error, determine at least one remedial measure based on the error type, apply the remedial measure, and identify the first content item as an erroneous content item in response to a failure of the remedial measure. The apparatus may be further configured to perform the remedial measure by at least performing an optical character recognition operation on the electronic document, parsing the electronic document subsequent to the optical character recognition operation to identify one or more text terms, and determining whether the one or more identified text terms include at least one valid value for at least one field of the set of document metadata.

Another example of an embodiment includes a non-transitory computer readable storage medium comprising instructions that, when executed by a processor, configure the processor to at least receive a first content item in an electronic content management system, the first content item comprising an electronic digital media item and a set of content metadata, validate the first content item, the validation performed according to a set of validation rules, wherein the validation determine that an error exists within the first content item, in response to determining that an error exists within the first content item, identify the first content item as an erroneous content item, generate error metadata associated with the first content item, generate a packaged erroneous content item comprising the first content item and the error metadata, and process the packaged erroneous content item by a workflow engine of the electronic content management system. The instructions may also configure the processor to receive a second content item, validate the second content item according to the set of validation rules, and in response to determining that the second content item passes validation, process the second content item by the workflow engine of the electronic content management system.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

INTRODUCTION

A method, apparatus and computer program product are provided in accordance with exemplary embodiments of the present invention to provide for improved error handing in a workflow management system. As noted above, the inventors have identified that present workflow management systems lack intelligent error handling systems resulting in inefficient performance and wasted system resources. To address these and other problems, the inventors have developed improved error handling systems that, instead of discarding erroneous content items, store the erroneous content items for further processing. Embodiments are operable to identify error metadata and to store that error metadata with the erroneous content item as a packaged erroneous content item. Packaged erroneous content items are processed by the workflow management system to generate notifications and interfaces for fixing the errors. Embodiments further provide for intelligent grouping of erroneous content items, and generation of tasks or other workflows to address errors. Embodiments may further identify the source of repeat errors based on commonalities among erroneous content items through analysis of the error metadata.

Upon detection of erroneous content items, embodiments may generate notifications that serve to notify users or external systems that erroneous content items are being received. Embodiments may also provide interfaces that allow administrative users to rectify errors by editing or updating data for erroneous content items. Some embodiments may also include functionality for automatically correcting content items, such as through the use of optical character recognition software or the like.

Upon correction of an error within an erroneous content item, the item may be validated and resubmitted for processing by the workflow management system, thus allowing a previously submitted content item to be corrected and processed by the system without requiring the content item to be retransmitted by the external system.

For the purposes of this disclosure, the term "workflow management system" is understood to refer to any system that is operable to receive one or more documents from an external system and to process, store, and or provide access to those received documents. In many such cases, these workflow management systems may be operable to analyze received content items to generate workflow tasks, to route those content items to other external systems, and the like. One example of such a content management system is OneContent® developed by McKesson Corporation.

For the purposes of this disclosure, the term "content item" is understood to refer to a digital media item and associated metadata received from an external system. Digital media items included in content items may include, for example, images (e.g., Digital Imaging and Communication in Medicine (DICOM) images), word processor documents, Portable Document Format (PDF) documents, audio files, video files, and the like. Metadata may be based on a type of data stored in the digital media item. For example, if the digital media item is a scanned image of a driver's license, the metadata may store a name, birthdate, driver's license number, and state of licensure. Each content item may have an associated type. However, while each content item may be associated with a particular content type, two or more different types of content item may use the same content type (e.g., an image stored in the same encoding format) but different content metadata (e.g., a driver's license content type and a birth certificate content type may both include images stored in the same format, but the driver's license content type may have a driver's license metadata entry while the birth certificate content type may have a birth city metadata entry).

For the purposes of this disclosure, the term "content type" is understood to refer to a structural definition of a set of content items. This structural definition includes rules defining the various metadata required to accompany each content item having that particular content type as the content item is received by a content management system.

For the purposes of this disclosure, the term "erroneous content item" is understood to refer to a content item that includes one or more metadata fields which has a value or values that cause the content item to fail a validation process. Such a validation process may, for example, involve verifying that each metadata item of the content item is present, stored within a particular database (e.g., a list of valid facilities), within a particular range, or the like.

Exemplary Apparatus

Figure 1:
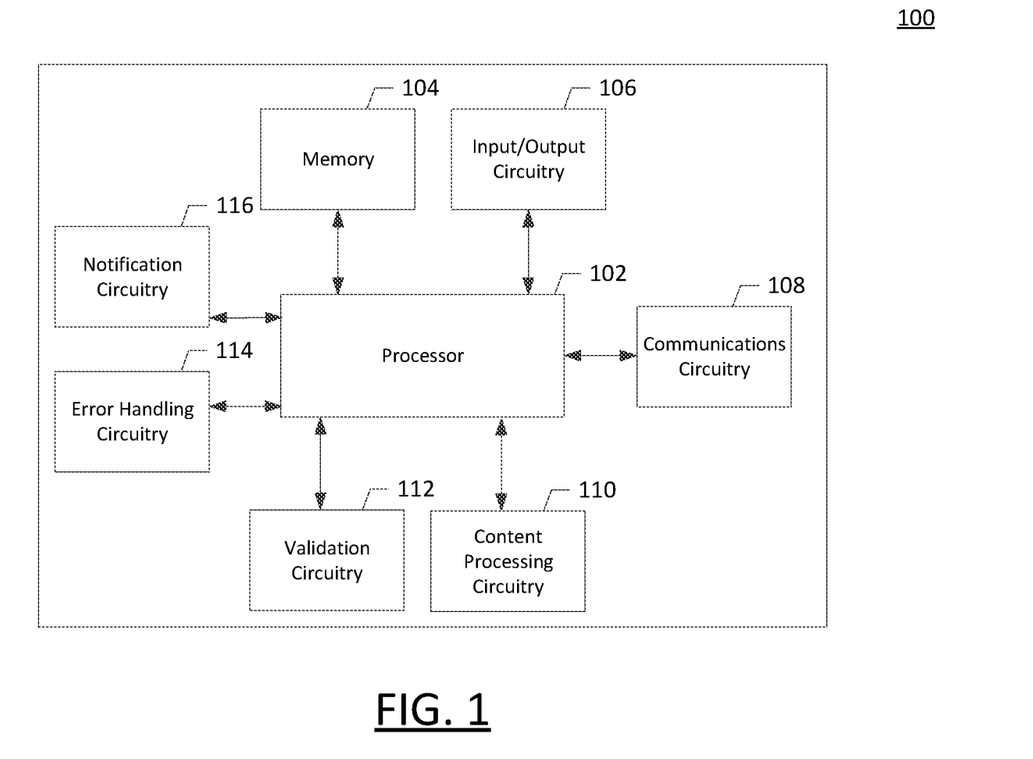
FIG. 1 is a block diagram of an apparatus for providing error handling in a workflow management system in accordance with some embodiments of the present invention.

FIG. 1 illustrates a block diagram of an apparatus 100 in accordance with some example embodiments. The apparatus 100 may be any computing device capable of handling errors in a workflow management system as described herein. For example, the apparatus 100 may be implemented as a computing device executing software for providing improved error handling in a workflow management system as described herein.

The apparatus 100 may be implemented as a standalone or rack-mounted server, a desktop computer, a laptop computer, a personal digital assistant, a tablet computer, a netbook computer, a mobile device, or the like. Accordingly, it will be appreciated that the apparatus 100 may comprise devices, hardware, and the like configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, content processing circuitry 110, validation circuitry 112, error handling circuitry 114, and notification circuitry 116. Although these components 102-116 are described with respect to functional limitations, it should be understood that the particular implementations necessarily include the use of particular hardware. It should also be understood that certain of these components 102-116 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, "circuitry" includes programmed processing circuitry, storage media, network interfaces, input/output devices, and/or the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like, such that each of the circuitries may be formed by other circuitry components of the apparatus 100.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may include various processing devices and may, for example, include one or more processing devices configured to perform independently from one another. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor represents an entity (e.g., physically embodied in circuitry) capable of performing operations according to an embodiment of the present invention while configured accordingly. Alternatively, as another example, when the processor is embodied as an executor of software instructions, and the instructions may specifically configure the processor to perform the algorithms and/or operations described herein when the instructions are executed.

In some embodiments, the apparatus 100 may include input/output circuitry 106 that may, in turn, be in communication with the processor 102 to provide output to the user and/or to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like). The input/output circuitry 106 may provide a mechanism for displaying an interface for correcting an error within an erroneous content item, receiving input via that interface to correct the error in the erroneous content item, displaying a notification indicating that an error has occurred in validation of one or more content items, or the like.

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The content processing circuitry 110 includes hardware configured to receive content items from one or more systems and to process the content items to enable storage, access, and workflow management operations. The content processing circuitry 110 is configured to identify the presence of particular content items and to execute workflow processing tasks based on the presence of those items. For example, the content processing circuitry 110 may be configured with a set of processing rules that trigger certain workflow tasks, notification events, or the like upon verifying that certain content items have been received. Such tasks may include, but are not limited to generating notifications to users when certain content items are received (e.g., notifying a clinician when a medical study is received or a billing department when a new patient is registered), routing information to external systems (e.g., routing a received medical imaging study from a picture archiving and communication system (PACS) to an electronic health records system), or the like. In some embodiments the content processing circuitry 110 is additionally or alternatively configured to store content items in one or more content databases. To perform these functions, the content processing circuitry 110 may include a processing element, such as the processor 102, programmed by an algorithm or algorithms to implement these features. The content items may be received by the content processing circuitry 110 through the use of a network interface or other communications mechanism, such as the communications circuitry 108.

The validation circuitry 112 includes hardware configured to validate received content items to determine whether the content items include errors. Error detection may be performed by the validation circuitry 112 examining the metadata of received content items as they are received to determine that the fields of metadata are populated, are within appropriate ranges, are included within a set of valid possible values (e.g., a metadata value does not provide an invalid reference or pointer), are consistent with one another, or the like. In some embodiments, validation may also be performed across content items, such as in cases where content items are provided as a group or as a set of large documents. Some embodiments may support grouping content items within particular contexts, and in some cases content items may be identified as erroneous if there is an inconsistency within the group. For example, if a batch processing job of documents indicates that all documents within a batch should be from a certain facility, and a document of the batch has metadata indicating it was received from a different facility, then the document associated with the different facility may be marked as erroneous even if the document would otherwise be valid. To perform these and other tasks, the validation circuitry 112 includes a processing element, such as the processor 102, programmed by an algorithm or algorithms to perform these functions. Upon detecting an error within the metadata of a received content item, the validation circuitry 112 marks the content item as erroneous, at which time the erroneous content item is processed by the error handling circuitry 114. The validation circuitry 112 may, for example, transmit the content item to the error handling circuitry via a bus, shared memory, or the like for further processing.

The error handling circuitry 114 includes hardware configured to receive a content item that fails validation and to perform further processing on that content item as a result of the content item's error state. The error handling circuitry 114 is configured to determine and/or generate error metadata associated with the erroneous content item and to package the erroneous content item along with the error metadata into a packaged content item. The packaged content item may include the original erroneous content item along with the error metadata, which may be stored as the metadata of the packaged content item. As a result, the packaged content item may include both the entire original content item and its original metadata, in addition to a set of error data. In some embodiments, this process is implemented by adding error metadata to the existing metadata of the content item, such that the metadata for the packaged content item is a superset of the original metadata and the error metadata. In this regard, the error handling circuitry 114 is configured to create a content item that, despite failing the validation process, is still usable for processing via the workflow management system.

In some embodiments, the error handling circuitry 114 is further configured to attempt to remediate errors within received erroneous content items. For example, in some embodiments the error handling circuitry 114 performs optical character recognition (OCR) or the like to identify the contents of a digital media item included within the content item, and to use that identified content to remediate errors. This error remediation process may be informed by the particular type of content item at issue. For example, if the content item is a driver's license and the driver's license metadata field is blank, then the content item may be flagged as erroneous. However, OCR techniques performed on a scan of the driver's license may be able to identify the driver's license number from the image. The error handling circuitry 114 may thus be able to correct the driver's license metadata field by parsing the identified text within the image and updating the metadata to reflect the identified text.

Other embodiments may correct errors through other techniques. For example, the error handling circuitry 114 may identify other content items processed as part of a batch processing job and identify likely candidates for missing metadata based on other content items included in the batch. In some embodiments, the error handling circuitry 114 may correct the errors entirely, while in other scenarios the error handling circuitry 114 may identify possible correct values (e.g., a subset of possible valid values) and present those possible correct values via an interface to correct the error. In some embodiments, where an automatic error correction occurs, the error handling circuitry 114 may mark the corrected content items as "corrected" and add them to a review queue or manual validation queue to ensure that a user separately verifies the corrected content item. This process of flagging an content item for manual correction may include, for example, editing a metadata field of the content item (e.g., to indicate "automatically corrected"), and forwarding the content item to the content processing circuitry 110 for further processing. The content processing circuitry 110 may then generate an interface for manual validation and populate that interface with one or more content items identified as "automatically corrected." These functions and the other functions of the error handling circuitry 114 may be performed by a processing element, such as the processor 102, as programmed by an algorithm or algorithms as described herein.

The notification circuitry 116 includes hardware configured to generate one or more notifications to users or external systems based on the processing actions performed by the error handling circuitry 114 and/or content processing circuitry 110. The notification circuitry 116 may, for example, generate a notification to a user or users via a management interface that may notify the user of validation errors on content items received by the apparatus 100. Such an interface may provide a mechanism for tracking errors as they occur. The interface provided by the notification circuitry 116 may also provide a mechanism for correcting errors, such as by allowing a user to enter or edit metadata for content items stored within packaged erroneous content items. As errors are corrected, tasks associated with correction of those errors may be marked as complete and the errors may be removed from the interface. The notification circuitry 116 may also be configured to generate one or more emails, text messages, or other alerts to notify a user or external system of a validation error or errors. These functions and other notification and interface functions may be performed by a processing element, such as the processor 102, as programmed by an algorithm or algorithms as described herein, in communication with a network interface such as provided by the communications circuitry 108 and/or input and output devices as provided by the input/output circuitry 106.

As will be appreciated, any computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example of Data Flow for Providing Improved Error Handling

Figure 2:
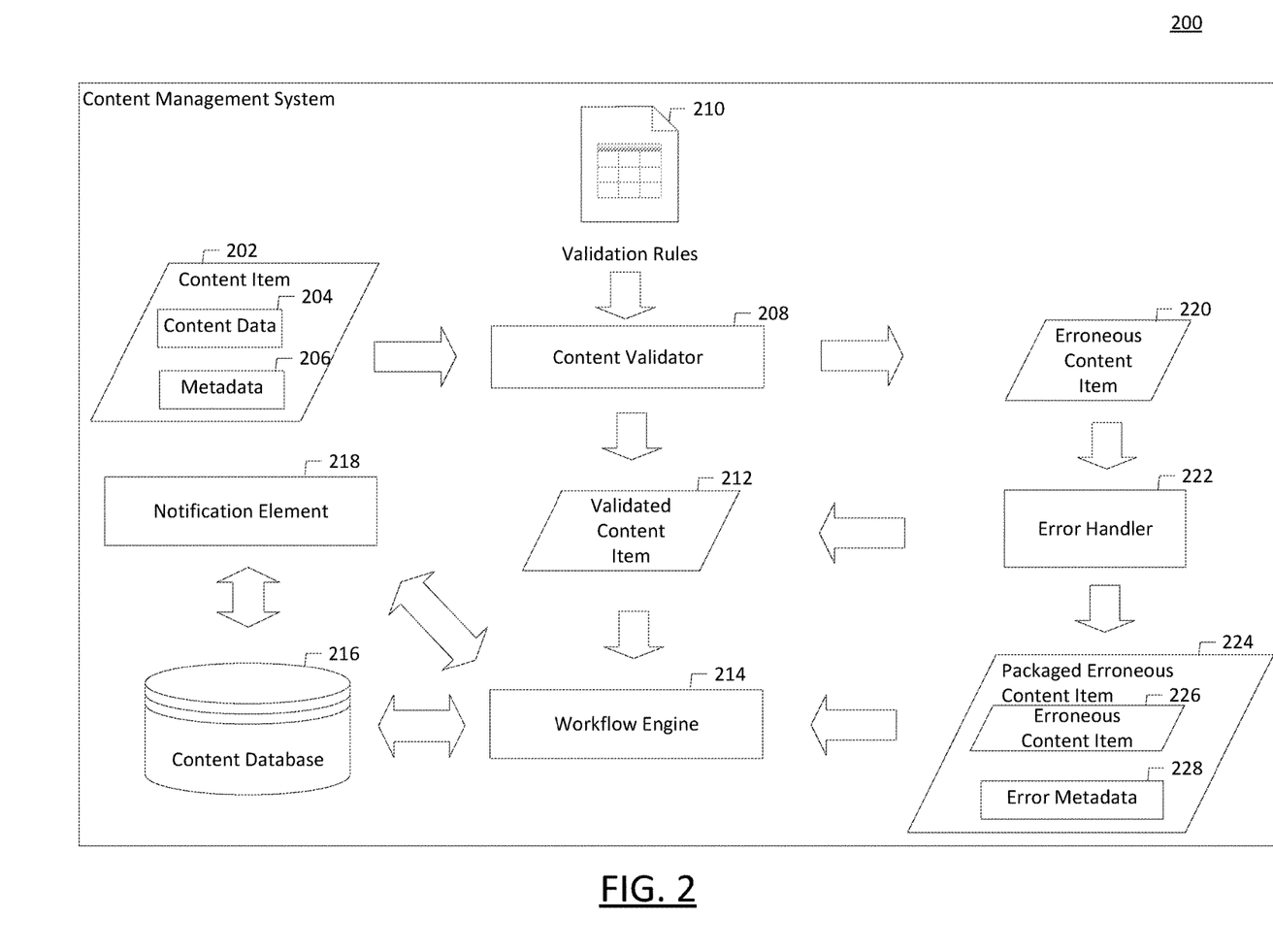
FIG. 2 depicts a data flow among elements of a workflow system in accordance with some embodiments of the present invention.

FIG. 2 illustrates a data flow describing exemplary system interactions among components of a workflow management system 200 in accordance with embodiments of the present invention. The workflow management system 200 may be implemented by a computing device or devices, such as the apparatus 100 described above with respect to FIG. 1. The workflow management system 200 is operable to receive a content item 202. The content item 202 may be provided by various external systems in communication with the workflow management system 200. For example, the content item 202 may be received from an electronic health records system, a billing system, a PACS workstation, a patient admission/discharge/transfer system, or the like.

The content item 202 includes content data 204 and metadata 206. The content data 204 includes a digital media item, such as an image, electronic health record file, word processor document, or other set of content for storage, processing, and/or access by the workflow management system 200. The metadata 206 includes data about the content item as applied by the external system that transmitted the content item or, in some embodiments, elements of the workflow management system 200 that add or edit the metadata upon intake of the content item. For example, the metadata 206 may include a type of the content item, a file format of the content data 204, a sending facility, a sending organization, a sending device, characteristics of the content item, a patient identifier, or any other type of data describing the content item 202.

A content validator 208 validates the content item based on a set of validation rules 210. The content validator 208 may be implemented, for example, by validation circuitry 112 as described above with respect to FIG. 1. The validation rules define 210 one or more requirements for processing of a received content item. These validation rules 210 may specify particular metadata elements that must be present for particular content item types, ranges of values for those metadata elements, rules for evaluating consistency between two or more items of metadata, or the like. If the content item passes validation, the content item is marked as a validated content item 212 to be passed to a workflow engine 214. If the content item 202 fails validation, the content item 202 is marked as an erroneous content item 220 to be passed to an error handler 222.

The workflow engine 214 processes the validated content item 212 to implement data access, storage, and workflow management operations of the workflow management system 200 as described herein. The workflow engine 214 may be implemented, for example, by the content processing circuitry 110 described above with respect to FIG. 1. The workflow engine 214 may identify received validated content items 212 and determine whether various conditions have occurred. For example, the workflow engine 214 may implement one or more data processing contexts which serve to group content items, determine if criteria associated with those contexts have been met, to generate workflow tasks for users and/or external systems based on the presence or content data stored within validated content items, and other processing functions. The workflow engine 214 may also monitor the status of tasks and status changes that occur to content items stored in a content database. As tasks are performed and status changes occur, the workflow engine 214 may perform further processing and evaluation of stored content items and creation of new tasks to continue to provide workflow management processes. Additional exemplary operations of such a workflow engine 214 are described further in U.S. patent application Ser. No. 14/674,598, filed Mar. 31, 2015, and entitled "Methods and Apparatuses for Providing Document Workflow Management," which is hereby incorporated by reference in its entirety.

The workflow engine 214 may serve to manage access to content stored in a content database 216. The content database 216 may serve as a repository for content items received and processed by the workflow engine 214. The workflow engine 214 may, in some embodiments, provide a mechanism for other external systems to access the content items stored in the content database 216, such that the workflow engine 214 also serves as an interface by which external systems may request and access stored content items.

The workflow management system 200 may also implement a notification element 218 in communication with the workflow engine 214 and the content database 216. The notification element 218 may be implemented, for example, by notification circuitry 116 as described above with respect to FIG. 1. The notification element 218 is configured to provide an interface and/or other mechanism for notifying users or external systems of particular scenarios or occurrences identified by the workflow engine 214. The notification element 218 may further be employed to improve a portion of an error processing flow as described herein by providing a mechanism for correction or other editing of content item metadata as stored within the content database 216. The workflow engine 214 may generate a task which is provided to the notification element 218 to indicate that a content item requires correction. The notification element 218 may implement an interface that allows the user or an external system to fix or edit content metadata stored within the content datastore 216.

If the content validator 208 determines that the content item 202 includes one or more errors, the content item 202 is provided to the error handler 222 as an erroneous content item 220. The error handler 222 may be implemented by error handling circuitry 114 as described above with respect to FIG. 1. The error handler 222 may review the erroneous content item 220 to determine or generate a set of metadata related to the error. For example, the error handler 222 may identify the type of error (or, in some embodiments, receive the type of error from the content validator 208), the time of the error, a batch value of the content item associated with the error, a facility that sent the erroneous content item, a missing or erroneous data field of the content item, or the like. The error handler 222 may generate a packaged erroneous content item 224 which includes the original erroneous content item 226 and the error metadata 228. As noted above, the packaged erroneous content item 224 may be generated by appending error metadata to the original content item, such that the packaged erroneous content item comprises a superset of metadata including both the original metadata and the error metadata. In other embodiments, the original content item may be nested within the packaged erroneous content item 224 such that the error metadata and the original content metadata are distinct sets from one another. The packaged erroneous content item 224 may be provided to the workflow engine 214 for processing as any properly validated content item, though the workflow applied to the packaged erroneous content item 224 is related to fixing the errors present within the erroneous content item.

In some embodiments, the error handler 222 may also be configured to attempt remediation of errors detected in the erroneous content item 220. For example, as noted above, the error handler may perform optical character recognition or other analysis techniques to make determinations of likely values for missing or erroneous metadata items. In the event the error handler 222 can remediate such errors, the error handler 222 may fix the error and mark the fixed content item as a validated content item 212. This validated content item 212 may then be processed normally by the workflow engine 214, though in some embodiments a content item validated in this manner may be flagged for separate verification by a user or other external system, such as by generation of an additional verification task for one or more users.

When a packaged erroneous content item 224 is processed by the workflow engine 214, the workflow engine 214 may generate one or more tasks for addressing the errors based on the error metadata. As noted above, in some embodiments the workflow engine 214 may generate an interface via the notification element 218 to provide a mechanism for correcting the error. Upon correction of the error within the original content item, the content item may be provided to the content validator 208 again and processed by the workflow management system 200 normally. In some cases, validation of a corrected content item may be expedited so that feedback may be provided indicating whether an operation to correct the content item (e.g., by editing or adding metadata through an interface) was successful in correcting the error that caused the content item to fail validation. In this manner, the results of an attempted correction may be provided immediately to allow a user or other correction process another opportunity to correct the error. Such a correction may also delete the packaged erroneous content item 224 once it is replaced by the corrected content item. In some embodiments, validation of the corrected content item may cause deletion of the error metadata from the packaged erroneous content item to indicate that the content item is no longer identified as being in an erroneous state. This may also initiate completion of a task related to correction of the error.

The workflow engine 214 may also be operable to generate one or more tasks related to groups of packaged erroneous content items. For example, in some scenarios the workflow engine 214 may implement one or more error contexts that organizes errors into groups having similar characteristics, such as erroneous content items from a particular source facility, erroneous content items with a common metadata field in error, erroneous content items received within a particular time window, or the like. These error contexts may be used to manage error correction tasks. For example, a single task may be created to correct the content items of each error context.

Exemplary Processes for Providing Improved Error Handling

Figure 3:
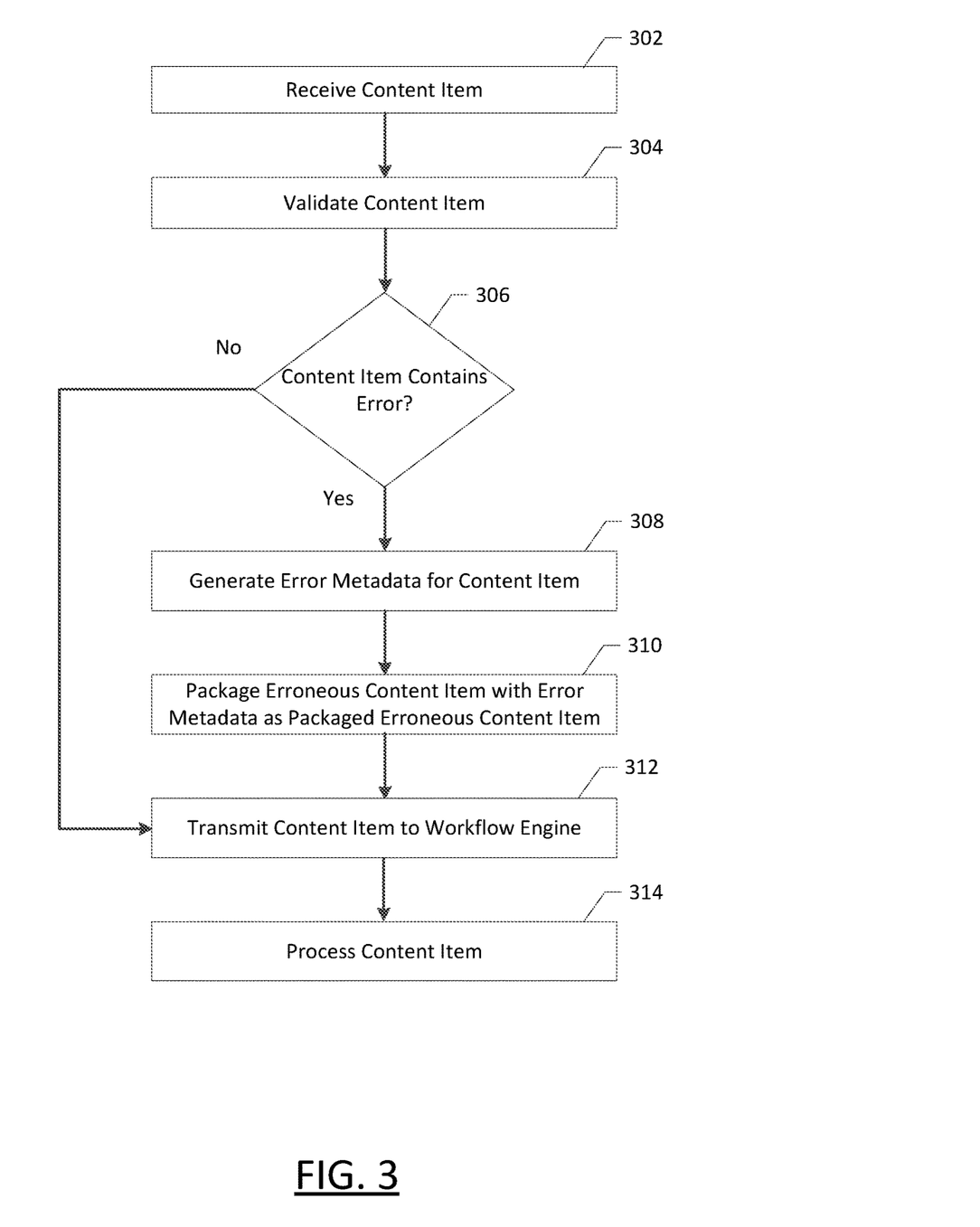
FIG. 3 is a flow diagram illustrating an example of an algorithm for processing content items in accordance with some embodiments of the present invention.

FIG. 3 is a flow diagram depicting an exemplary process 300 as performed by a computing device, such as the apparatus 100, for processing content items and handling error conditions for content items received by a workflow management system. Embodiments of the process 300 serve to identify erroneous content items and to facilitate processing of those content items using the structures of a workflow engine to improve the process by which these erroneous content items are addressed using that same workflow engine. In this regard, the process 300 illustrates an example of an algorithm that is implemented via hardware or software executing on hardware components of an apparatus to implement these tasks and other tasks related to workflow management. This algorithm may serve as means for implementing these tasks and other functions as described above and herein.

At action 302, a content item is received. As noted above, the content item may include a digital media item and a set of metadata, though it should be appreciated in some embodiments that a content item may consist primarily or solely of metadata describing a system state, a status, or as a message from an external system, such as to indicate that a particular condition has occurred.

At action 304, the content item is validated. Validation of the content item may include verifying that the content item includes appropriate metadata consistent with an identified type of the content item. For example, a particular content item type (e.g., a driver's license) may require certain metadata fields to accompany it (e.g., driver's license number, state of origin, full name of licensee). If one or more of these fields are empty or of an invalid value, the validation of the content item may fail. Other examples of failures include scenarios where inconsistencies are identified over multiple separate content items, detection that content items include metadata with fields that are not valid (e.g., a facility identifier for a facility that is not registered with a workflow management system), or the like.

At action 306, if the content item was successfully validated, the process proceeds to action 312 where the content item is forwarded to a workflow engine for processing. If the content item contains an error, the content item is processed according to an error handling routine beginning at action 308.

At action 308, error metadata is generated for the content item. As noted above, the error metadata may include information about the field or fields that failed validation, the facility that transmitted the erroneous content item, a batch number if the content item is part of a batch processing job (e.g., a batch digital media item transmission or scanning operation), the time at which the erroneous content item was transmitted, or the like. As noted above, the error metadata may be appended to other metadata included within the content item, such that the content item metadata is a superset of both the original content metadata and the error metadata, while in other embodiments the error metadata may be stored separately from the original content metadata. At action 310, the content item with the error and the error metadata are packaged to generate a packaged erroneous content item. As noted above, the packaged erroneous content item may include the original erroneous content item, along with the error metadata.

At action 312, the content item is transmitted to the workflow engine. The content item may be the original content item which passed validation at action 304, or the content item may be the packaged erroneous content item resulting from the error handling routines performed at actions 308 and 310. Packaging of the erroneous content item in this manner allows the workflow engine to process the content item through error handling as if the content item was a properly validated content item received from an external system. The workflow engine may then process the erroneous content item to execute a workflow designed to remediate the content item and/or address the problem that caused the original error.

At action 314, the content item is processed by the workflow engine. As noted above, processing the content item may include standard workflow processing (e.g., if the original content item properly validated), or error handling workflow processing in cases where the content item fails validation and is then packaged with error metadata.

Figure 4:
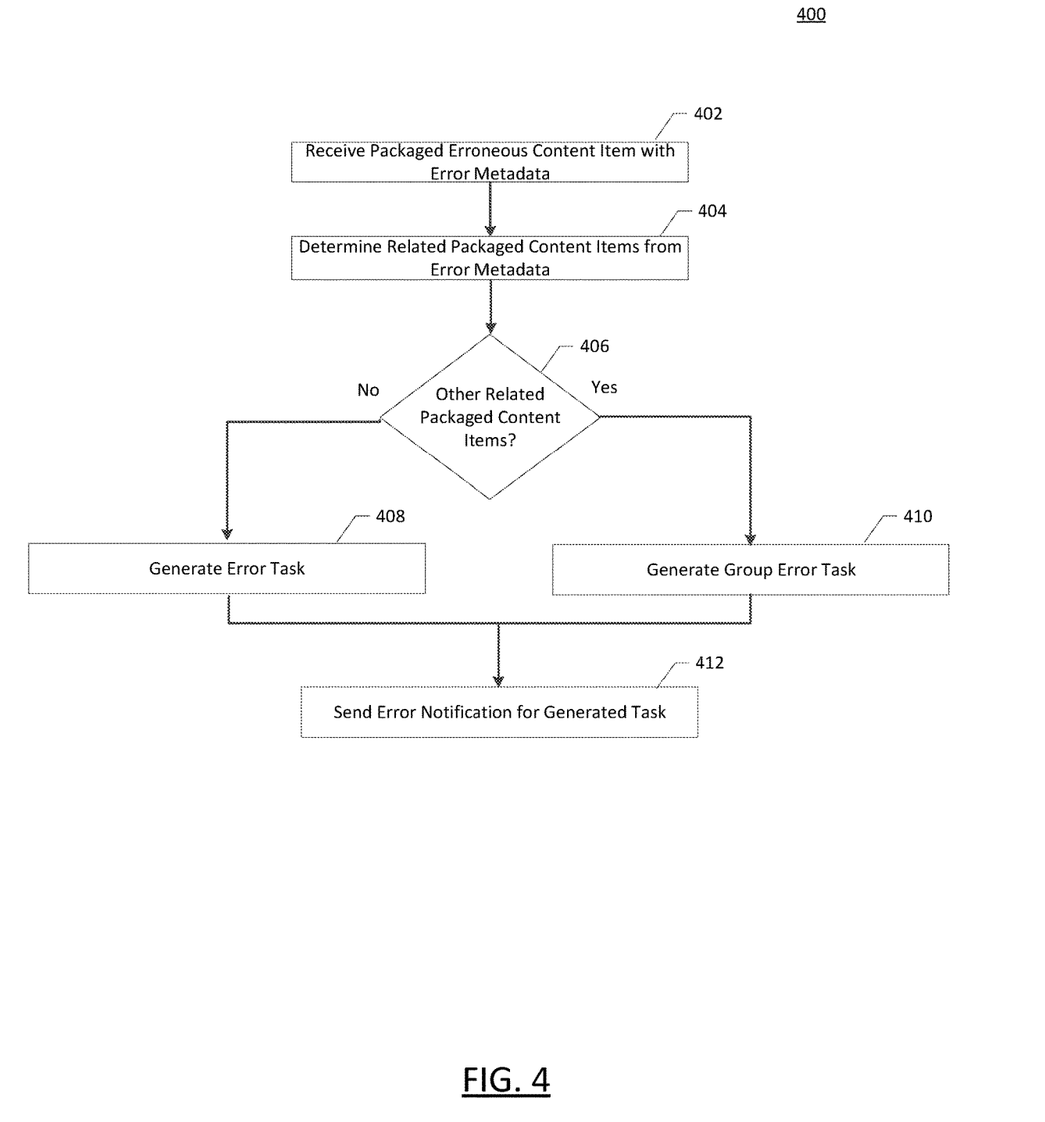
FIG. 4 is a flow diagram illustrating an example of an algorithm for processing a packaged erroneous content item in accordance with some embodiments of the present invention.

FIG. 4 is a flow diagram depicting an exemplary process 400 as performed by a computing device, such as the apparatus 100, for processing packaged erroneous content items by a workflow engine. Embodiments of the process 400 serve to receive packaged erroneous content items and to process those content items as a particular type of content item available for processing by the workflow engine. In this regard, the process 400 illustrates an example of an algorithm that is implemented via hardware or software executing on hardware components of an apparatus to implement these tasks and other tasks related to workflow management. This algorithm may serve as means for implementing these tasks and other functions as described above and herein.

At action 402, a packaged erroneous content item is received. As noted above, the packaged erroneous content item may be received from an error handler also implemented by a workflow management system.

At action 404, error metadata within the packaged erroneous content item is processed to determine if any related packaged erroneous content items have been received. In this regard, the process 400 may determine whether other packaged erroneous content items were received from the same batch processing job, whether other packaged erroneous content items were received at a similar time, whether other packaged erroneous content items were received from a same transmitting facility, or have any other common characteristic or characteristics as indicated by the error metadata. Various different criteria for grouping packaged erroneous content items together may be defined within a set of rules that define different contexts for grouping the packaged erroneous content items. A workflow engine may be configured to implement these rules to organize the packaged erroneous content items into groups having one or more of the same or similar characteristics.

At action 408, a determination is made as to whether any other packaged erroneous content items have been received with the same or similar characteristics. If not, the process proceeds to action 408 where a task is created for the single packaged erroneous content item. If so, then the process proceeds to action 410 where a task is created or edited for the group of packaged erroneous content items to reflect the newly created or updated group.

At action 412, an error notification is sent for the task defined at action 408 or defined or updated at action 410. The error notification may include generation of an interface or interfaces allowing a user or external system to submit corrections to address the error.

Figure 5:
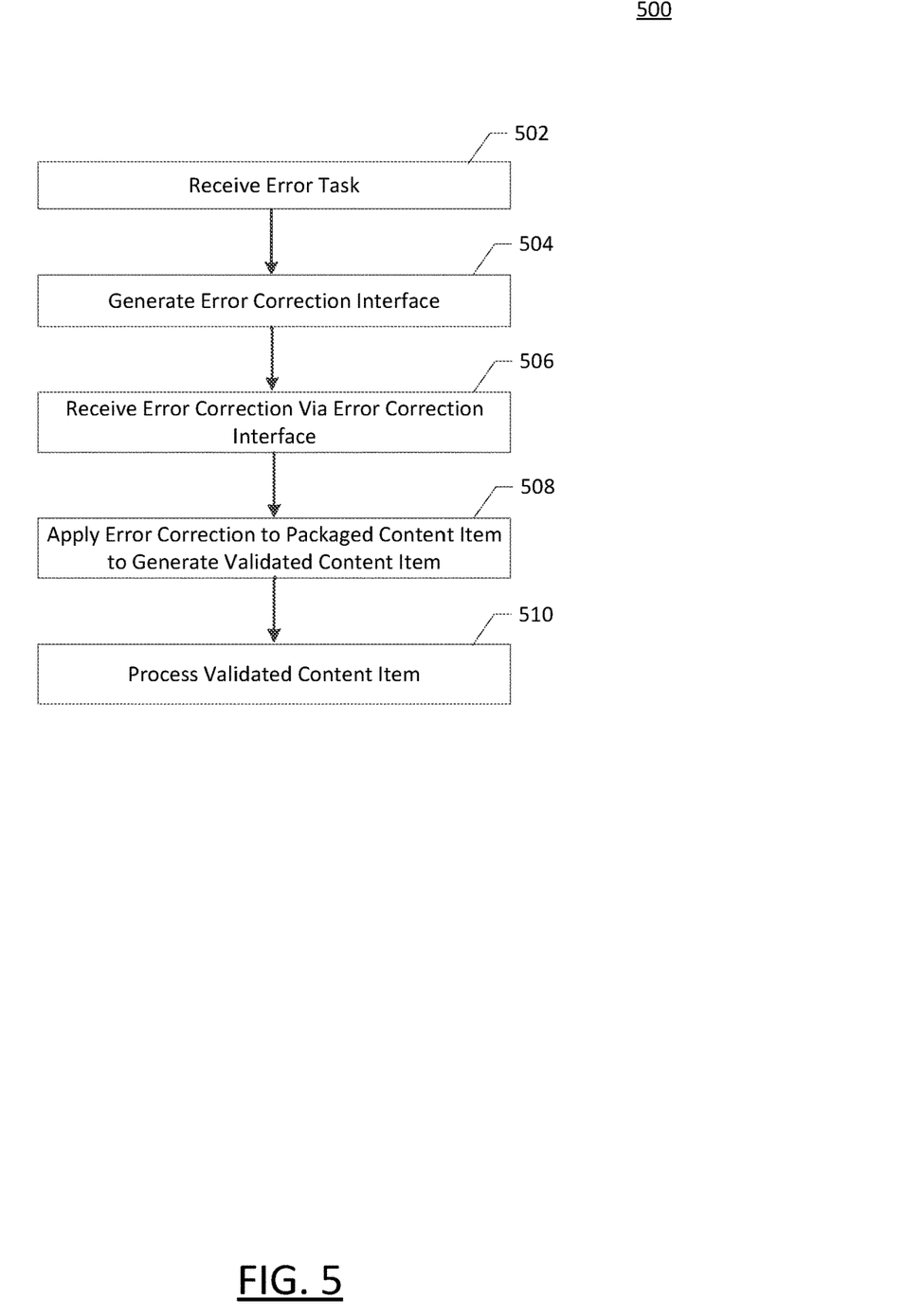
FIG. 5 is a flow diagram illustrating an example of an algorithm for receiving a correction to an erroneous content item via an interface accordance with some embodiments of the present invention.

FIG. 5 is a flow diagram depicting an exemplary process 500 as performed by a computing device, such as the apparatus 100, for generating a user interface for correction of an erroneous content item by a workflow engine and using that interface to correct the erroneous content item. Embodiments of the process 500 serve to receive a task associated with an erroneous content item and to generate an interface for fixing that erroneous content item based on the received task. In this regard, the process 400 illustrates an example of an algorithm that is implemented via hardware or software executing on hardware components of an apparatus to implement these tasks and other tasks related to workflow management. This algorithm may serve as means for implementing these tasks and other functions as described above and herein.

At action 502, the process 500 receives an indication of an error task. The error task may, for example, be generated by a workflow engine in response to the workflow engine receiving a packaged erroneous content item and processing that packaged erroneous content item to generate the error task. The error task may include, for example, a task notification for transmission to a particular administrator or user notifying them of the error condition.

At action 504, an interface for correcting the error is generated. The interface for correcting the error provides a mechanism by which a user, administrator, or external system may add, update, or edit metadata of the erroneous content item associated with the error task in order to enable correction of the original error. The interface may include, for example, fields for entry of text data, selection of alternative data, suggestion of possible corrected data, or the like.

At action 506, the interface is provided and a correction to the error is received. At action 508, the error correction is applied to the packaged erroneous content item to correct the error. Correction of the error results in the packaged erroneous content item being unpackaged and stored as a validated content item instead. This process may include deleting or archiving the error metadata and processing the content item as previously presented, subject to the fix of the error. Receiving a purported correction to the error may immediately initiate or otherwise expedite a validation process for the content item to ensure that the error was properly corrected. If the error is not corrected by the purported correction received from the interface, the content item may remain in an erroneous state. If the error is corrected, then the content item is validated. At action 510, the validated content item is processed to continue to enable workflow management operations.

Figure 6:
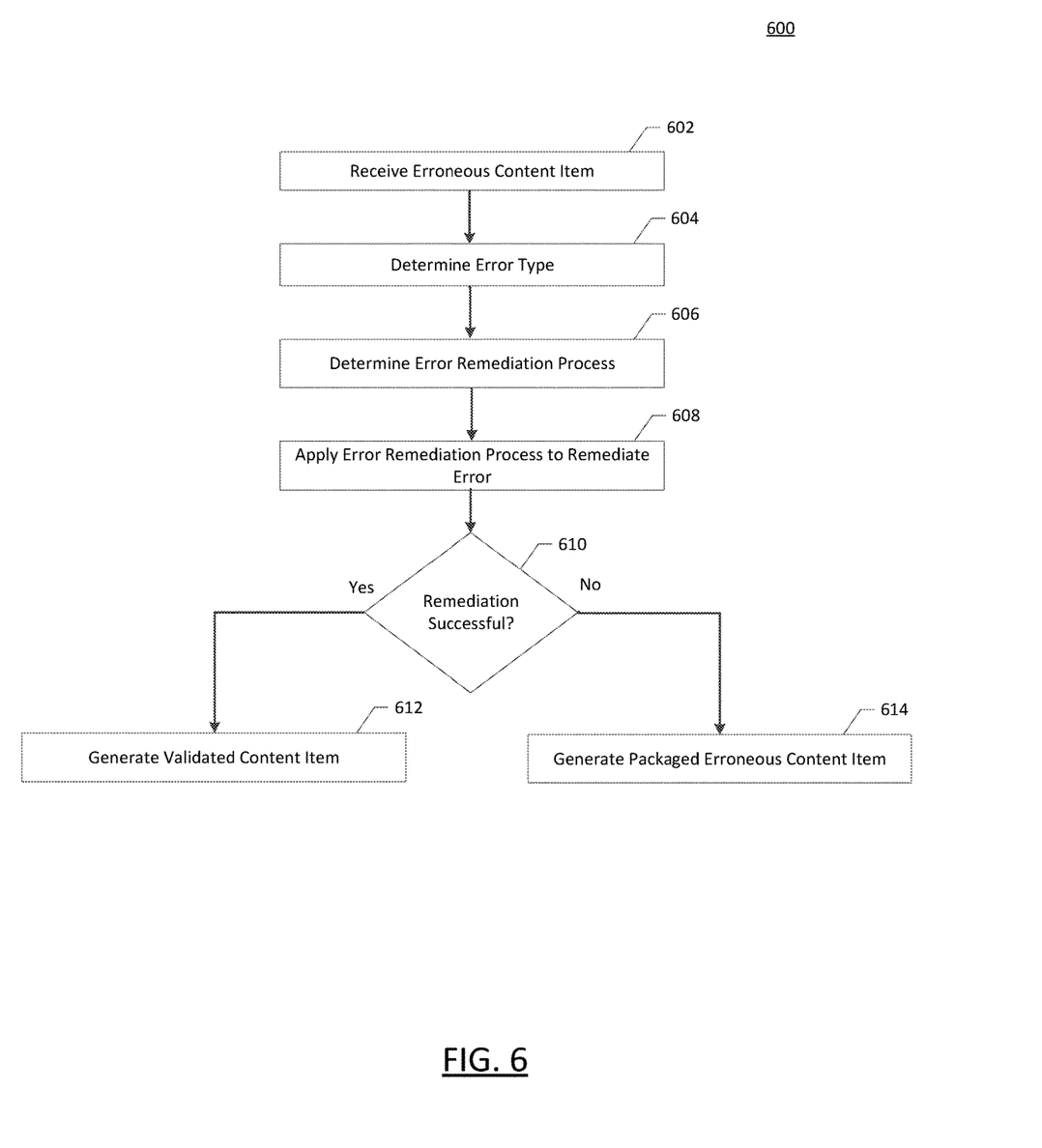
FIG. 6 is a flow diagram illustrating an example of an algorithm for automatically rectifying an error in an erroneous content item in accordance with some embodiments of the present invention.

FIG. 6 is a flow diagram depicting an exemplary process 600 as performed by a computing device, such as the apparatus 100, for automatically correcting errors of erroneous content items. Embodiments of the process 600 serve to provide an alternative mechanism for addressing errors in received content items such that automated error recovery techniques are applied to erroneous content items received by a workflow management system. In this regard, the process 600 illustrates an example of an algorithm that is implemented via hardware or software executing on hardware components of an apparatus to implement these tasks and other tasks related to automated error correction. This algorithm may serve as means for implementing these tasks and other functions as described above and herein.

At action 602, an erroneous content item is received. As noted above, the erroneous content item may have one or more of a variety of different types of errors. At action 604, an error type is determined. The error type may be determined by a validation element, by identifying which, if any, metadata fields fail to validate and transmitting that error type to an error handler, or the error type may be determined by the error handler separately through analysis of the content item. At action 606, an appropriate error remediation process is determined based on the error type. Some error types may be more amenable to automated remediation processes than others. For example, if the content item contains a digital media item that is likely to contain information relating to a missing metadata field (e.g., a driver's license scan with a missing driver's license number field), then it may be possible to obtain the missing data via applying OCR techniques to the digital media item. However, if a missing or incorrectly entered field is not included within the digital media item, then alternative remediation techniques may be selected or no remediation may be possible.

At action 608, the determined remediation process is performed to attempt to remediate the error. If, for example, the correct data can be located within the digital media item, then the process may populate the appropriate metadata field for the digital media item with the located data. At action 610, the process branches based on whether the remediation was successful. If successful, the process proceeds to action 612 where the content item is remediated and stored and/or processed as a properly validated content item. Otherwise, the process proceeds to action 614 where the erroneous content item is processed according to an error handling process, such as described above with respect to FIGS. 2-5.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 or 204 of an apparatus employing an embodiment of the present invention and executed by a processor 102 or 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method executed by a processor for providing improved error handling, the method comprising:

receiving a first content item at an electronic content management system, the first content item comprising an electronic digital media item and a set of content metadata, wherein the first content item is received by the electronic content management system from an external system that maintains the content item, wherein the first content item is part of a batch processing job performed by the electronic content management system for a plurality of content items;

validating the first content item, the validation performed according to a set of validation rules, wherein the validation determines that an error exists within the first content item;

in response to determining that an error exists within the first content item, identifying the first content item as an erroneous content item;

generating error metadata associated with the first content item;

generating a packaged erroneous content item comprising the first content item and the error metadata; and processing the packaged erroneous content item by a workflow engine of the electronic content management system, wherein processing the packaged erroneous content item further comprises:

determining that the error metadata of the packaged erroneous content item shares a common characteristic with a second packaged erroneous content item;

grouping the packaged erroneous content item and the second packaged erroneous content item in an error context; and generating a single task for correcting the packaged erroneous content item and the second packaged erroneous content item.

2. The method of claim 1, further comprising:

receiving a second content item;

validating the second content item according to the set of validation rules; and in response to determining that the second content item passes validation, processing the second content item by the workflow engine of the electronic content management system.

3. The method of claim 1, wherein processing the packaged erroneous content item further comprises:

generating an interface for receiving an edit to the set of content metadata;

receiving, via the interface, the edit to the set of content metadata;

applying the edit to the first content item;
validating the first content item again subsequent to applying the edit to the first content item; and
processing the first content item by the workflow engine in response to successfully validating the first content item.

4. The method of claim 1, wherein processing the packaged erroneous content item further comprises:
generating a task for correcting the first content item; and
transmitting a notification of the task to a user.

5. The method of claim 4, further comprising:
receiving a correction to the first content item;
validating the first content item subsequent to receiving the correction; and
deleting the task for correcting the first content item in response to successfully validating the first content item.

6. The method of claim 1, wherein the error metadata comprises an indicator of a metadata field that failed validation, a batch processing identifier, and a time at which the first content item was received.

7. The method of claim 1, further comprising:
determining an error type of the error;
determining a remedial measure based on the error type;
applying the remedial measure; and
identifying the first content item as an erroneous content item in response to a failure of the remedial measure.

8. The method of claim 7, wherein the remedial measure comprises:
performing an optical character recognition operation on the first content item;
parsing the first content item subsequent to the optical character recognition operation to identify a text term; and
determining whether the text term includes a valid value for a field of the set of content metadata.

9. An apparatus for providing improved error handling, the apparatus comprising a processor and a memory, the memory storing instructions that configure the processor to at least:
receive a first content item in an electronic content management system, the first content item comprising an electronic digital media item and a set of content metadata, wherein the first content item is received by the electronic content management system from an external system that maintains the content item, wherein the first content item is part of a batch processing job performed by the electronic content management system for a plurality of content items;
validate the first content item, the validation performed according to a set of validation rules, wherein the validation determines that an error exists within the first content item;
in response to determining that an error exists within the first content item, identify the first content item as an erroneous content item;
generate error metadata associated with the first content item;
generate a packaged erroneous content item comprising the first content item and the error metadata; and
process the packaged erroneous content item by a workflow engine of the electronic content management system, wherein the apparatus is further configured to process the packaged erroneous content item by at least:

determining that the error metadata of the packaged erroneous content item shares a common characteristic with a second packaged erroneous content item;
grouping the packaged erroneous content item and the second packaged erroneous content item in an error context; and
generating a single task for correcting the packaged erroneous content item and the second packaged erroneous content item.

10. The apparatus of claim 9, further configured to:
receive a second content item;
validate the second content item according to the set of validation rules; and
in response to determining that the second content item passes validation, process the second content item by the workflow engine of the electronic content management system.

11. The apparatus of claim 9, further configured to process the packaged erroneous content item by at least:
generating an interface for receiving an edit to the set of content metadata;
receiving, via the interface, the edit to the set of content metadata;
applying the edit to the first content item;
validating the first content item again subsequent to applying the edit to the first content item; and
processing the first content item by the workflow engine in response to successfully validating the first content item.

12. The apparatus of claim 9, further configured to process the packaged erroneous content item by at least:
generating a task for correcting the first content item; and
transmitting a notification of the task to a user.

13. The apparatus of claim 12, further configured to:
receive a correction to the first content item;
validate the first content item subsequent to receiving the correction; and
delete the task for correcting the first content item in response to successfully validating the first content item.

14. The apparatus of claim 9, wherein the error metadata comprises an indicator of a metadata field that failed validation, a batch processing identifier, and a time at which the first content item was received.

15. The apparatus of claim 9, further configured to:
determine an error type of the error;
determine a remedial measure based on the error type;
apply the remedial measure; and
identify the first content item as an erroneous content item in response to a failure of the remedial measure.

16. The apparatus of claim 15, further configured to perform the remedial measure by at least:
performing an optical character recognition operation on the first content item;
parsing the first content item subsequent to the optical character recognition operation to identify a text term; and
determining whether the text term includes a valid value for a field of the set of content metadata.

17. A non-transitory computer readable storage medium comprising instructions that, when executed by a processor, configure the processor to at least:
receive a first content item in an electronic content management system, the first content item comprising an electronic digital media item and a set of content metadata, wherein the first content item is received by the electronic content management system from an external system that maintains the content item, wherein the first content item is part of a batch processing job performed by the electronic content management system for a plurality of content items;

validate the first content item, the validation performed according to a set of validation rules, wherein the validation determines that an error exists within the first content item;

in response to determining that an error exists within the first content item, identify the first content item as an erroneous content item;

generate error metadata associated with the first content item;

generate a packaged erroneous content item comprising the first content item and the error metadata; and process the packaged erroneous content item by a workflow engine of the electronic content management system, wherein the instructions further configure the processor to process the packaged erroneous content item by at least:

determining that the error metadata of the packaged erroneous content item shares a common characteristic with a second packaged erroneous content item;

grouping the packaged erroneous content item and the second packaged erroneous content item in an error context; and generating a single task for correcting the packaged erroneous content item and the second packaged erroneous content item.

18. The computer readable storage medium of claim 17, further comprising instructions that configure the processor to:

receive a second content item;

validate the second content item according to the set of validation rules; and in response to determining that the second content item passes validation, process the second content item by the workflow engine of the electronic content management system.

* * * * *